May 15, 1934.   N. W. MATHEY   1,958,921
TRIMMING MACHINE
Original Filed Nov. 30, 1931   2 Sheets-Sheet 1
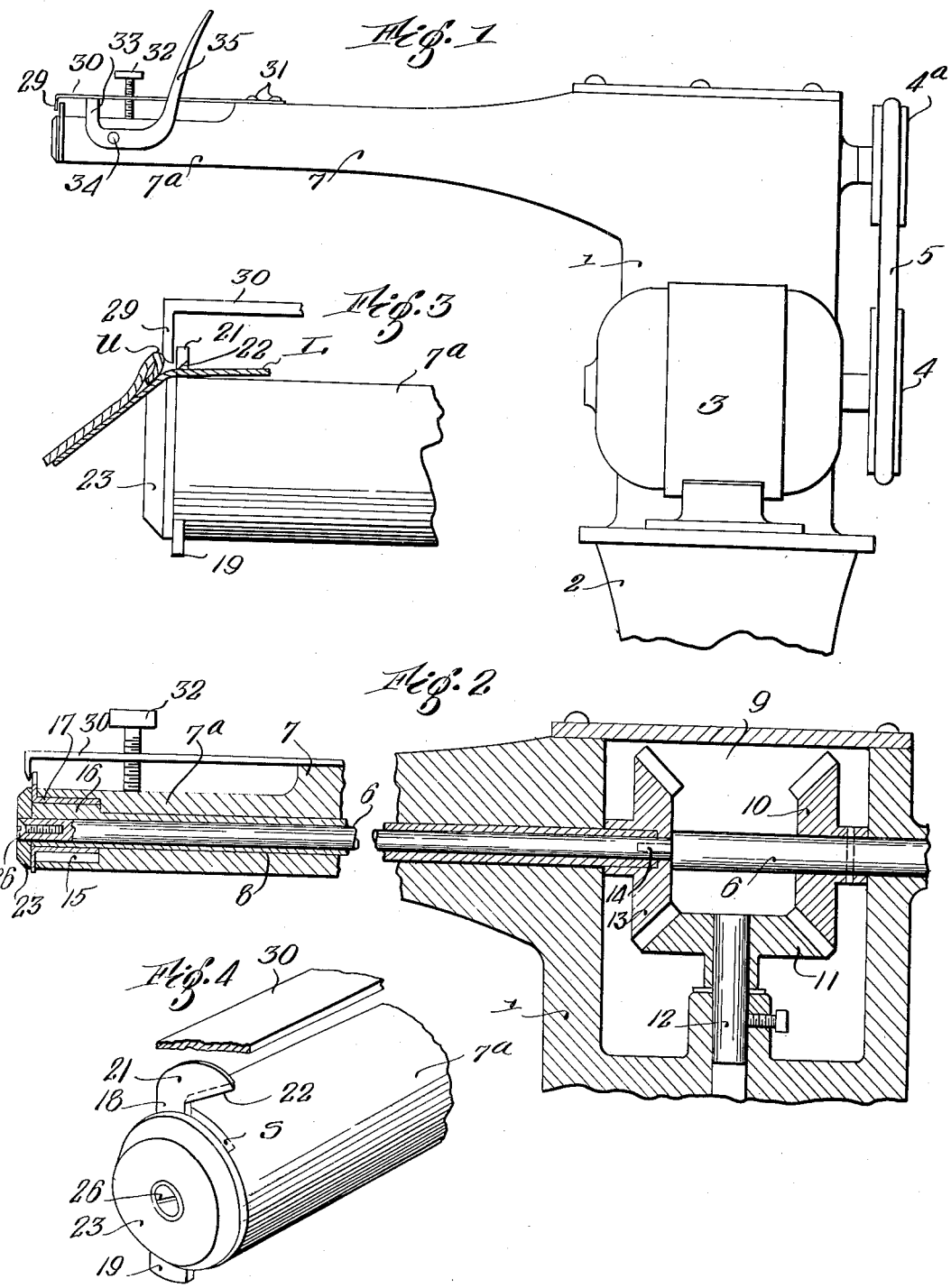
Inventor
Nicholas W. Mathey
by Roberts Cushman & Woodberry
his Attorneys.

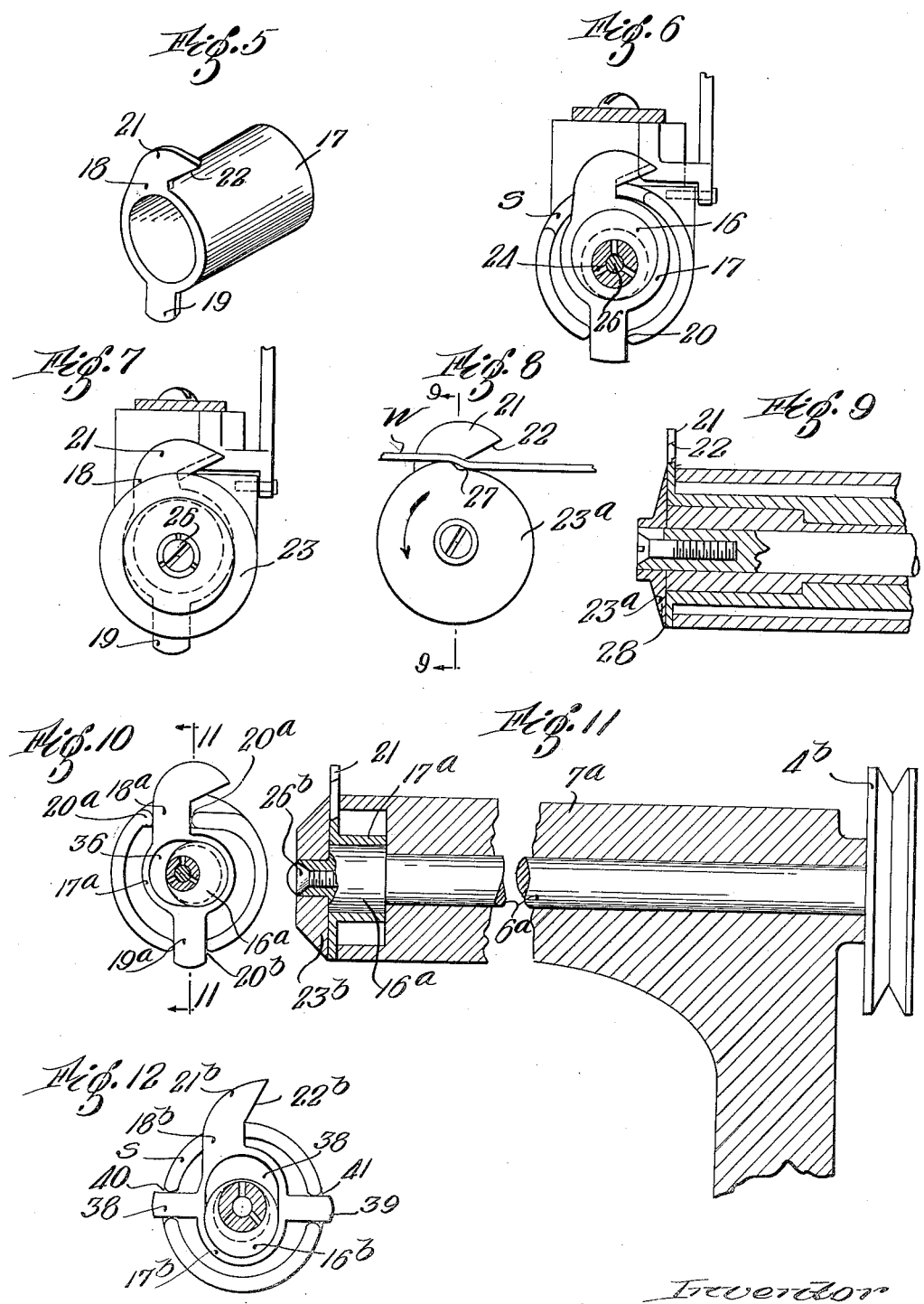

Patented May 15, 1934

1,958,921

UNITED STATES PATENT OFFICE 1,958,921

TRIMMING MACHINE

Nicholas W. Mathey, Boston, Mass.

Application November 30, 1931, Serial No. 577,980
Renewed September 27, 1933

21 Claims. (Cl. 12—51)

This invention pertains to cutting and trimming machines and relates more particularly to machines for trimming or cutting thin, flexible material such as leather, textile fabric or rubber comprised in a shoe upper. For trimming shoe uppers or other articles or parts of hollow, tubular, or similar character, or having relatively small openings, difficultly accessible pockets, recesses or corners, it is essential that the cutter supporting parts and associated elements be disposed in as small a space and in as compact an assemblage as is practicable, since otherwise it would not be possible to trim those portions of the work that are difficult of access. For similar reasons, it is desirable to avoid the use of exposed moving parts, other than the cutting elements, and to make the parts adjacent to the cutting means as smooth and free from projections as possible.

The present invention has for its general object the provision of a trimming machine having the desirable characteristics above outlined, and which may be driven at high speed without excessive vibration, thereby insuring a smooth, clean cut, and wherein the operative parts are of simple and inexpensive construction. It is a further object of the invention to provide a machine whose moving parts are as small and light as is consistent with the performance of their intended functions so that they may have relatively small inertia as compared with usual machines of this type, thus reducing the power required to a minimum, while at the same time greatly increasing the durability of the machine as a whole.

For best results I find it desirable to provide a work support in the nature of an overhanging arm or horn of such length and transverse dimensions as to permit its insertion within the work to be operated on, and in a preferred arrangement I employ relatively movable cutters arranged to give a shear cut. In one construction the edges of both cutting elements are caused to move in curved paths of approach toward the work, and the motion of the cutters is preferably such as to assist in feeding the work toward the cutting point. In a modified embodiment one of the cutters may be a rotary cutter while the other is a vibrating cutter moving in a substantially rectilinear path, or as a further alternative one of the cutters may be stationary while the other is moved. For certain classes of work, it is desirable to supply a work guiding member to assist in guiding the work toward the cutters, and under some circumstances for guarding the work or a portion thereof from contact with the cutting elements. These and other desirable features will be described more fully hereinafter.

While the machine has previously been referred to as of especial utility in trimming "shoe uppers" (by which term I mean to include footwear or parts of footwear in general, as for example boots, shoes, pumps, rubber overshoes, etc.), I contemplate its usefulness for other purposes for instance in trimming parts of garments other than footwear, bags, pouches, pocket books, etc. and in fact in general any element consisting of sheet-like material which is to be trimmed or cut, the provision of the long overhanging work supporting arm or horn, which also carries the cutting instrumentalities, facilitating the use of the machine for almost any trimming operation.

In the drawings:

Fig. 1 is a side elevation showing the complete machine with the exception of the pedestal or column upon which it may be mounted;

Fig. 2 is a fragmentary vertical section to larger scale than Fig. 1 on the vertical plane through the axis of the main drive shaft;

Fig. 3 is a fragmentary elevation to larger scale illustrating the left-hand end of the machine as viewed in Fig. 1, and showing the mode of operation of a work guiding and guarding member when trimming a shoe upper;

Fig. 4 is a fragmentary perspective view showing the free end of the work supporting arm with the cutters mounted thereon;

Fig. 5 is a perspective view illustrating a preferred form of cutter;

Fig. 6 is an end elevation, partly in vertical section, showing the free end of the work supporting arm with the vibratory cutter in place but with the shear member removed;

Fig. 7 is a view similar to Fig. 6 but showing the shear member in place;

Fig. 8 is an end elevation showing a rotary shear cutter of modified construction;

Fig. 9 is a vertical section through the work supporting arm substantially on the line 9—9 of Fig. 8;

Fig. 10 is an end elevation, partly in vertical section, omitting the rotary shear member and showing a modified form of vibratory cutter;

Fig. 11 is a fragmentary vertical section upon the line 11—11 of Fig. 10 but showing the rotary shear cutter in place; and Fig. 12 is a view similar to Fig. 10 but illustrating a further modification.

Referring to the drawings, the machine is shown in Fig. 1 as comprising a frame having a base portion 1 which may conveniently be a casting, and which is provided with a suitable bottom flange or the like adapted for mounting upon a bench, or for certain classes of work upon the top of pedestal or column 2 standing upon the floor. The base 1 as herein shown carries an electric motor 3 for the individual drive of the machine, it being contemplated that in place of the motor the machine may be driven by a belt from any other suitable source of power. As illustrated, the motor shaft carries a pulley 4 which drives a pulley 4a on the main shaft 6 of the machine by means of a belt 5. The main shaft 6 is journalled in bearings in the frame member 1 and extends laterally through an overhanging work supporting horn or arm 7 here shown as integral with the part 1. This work supporting arm is preferably of relatively small cross sectional area and toward its outer or free end may be further reduced in size as shown at 7a. The length of this arm and its diameter (the arm preferably being of circular or substantially circular section) is such as to permit its ready introduction into the work to be operated on, it being evident that in accordance with the class of the work the dimensions of this arm may be varied.

The arm 7 has a longitudinal bore coaxial with the shaft 6 and through which the shaft extends. Within this bore is arranged a tubular shaft 8 which telescopes over the shaft 6, the two shafts preferably being driven in opposite directions. The mechanism for driving the tubular shaft 8 oppositely to the shaft 6 is conveniently housed within a cavity 9 within the frame member 1 and comprises a bevel gear 10 pinned to the shaft 6 and meshing with a bevel gear 11 turning freely on a stub shaft 12 secured in the machine frame. This gear 11 meshes with a bevel gear 13 turning freely on a reduced portion of the shaft 6 and having a socket for the reception of the end of the tubular shaft 8, the latter shaft being splined at 14 to the gear 13.

At its outer or free end the work supporting arm 7 is provided with a recess 15 preferably concentric with the shaft 6 and adapted to house an eccentric 16 carried by the tubular shaft 8.

Referring more particularly to Fig. 5, the vibratory cutter comprises a sleeve 17 which telescopes over the eccentric 16, and which in fact constitutes an eccentric strap. This sleeve is provided at its outer end with radial arms 18 and 19, the first of which passes freely through a circumferentially elongate notch S (Fig. 4) in the extreme outer edge of the arm 7, while the part 19 passes through a slot 20 (Fig. 6) also in the edge of the arm 7. The slot 20 is of a width substantially equal to the width of the arm 19 but is provided with rounded edges so that the arm 19 may not only slide but may also rock within the slot. The arm 18 is provided with a beak 21 having a beveled cutting edge 22 preferably inclined with reference to the length of the arm 18.

A second cutter or shear member 23 is secured to the extreme outer end of the shaft 6 to turn with the latter. As here shown, this shear member consists of a disk of substantially the same diameter as the outer end of the arm 7, such disk having a cutting edge adapted to cooperate with the edge 22 of the vibratory cutter so as to produce a shear cut. The end of the shaft 6 is preferably provided with an internally screw-threaded bore and is radially slotted as shown at 24, the bore having a beveled countersink adapted to receive the head of an attaching screw 26 by means of which the cutter 23 is securely united to the shaft 6.

In the construction just described, the shaft 6 is driven for example in the direction of the arrow shown in Fig. 7, while the shaft 8 turns in the other direction and the arrangement of the eccentric 16 and the arms 18 and 19 is such that as the cutting edge 22 moves downwardly toward the work it also moves in an arcuate or curvilinear path to cooperate with the edge of the cutter 23 in producing a true shear cut. At the same time the arrangement of the parts is such that upon its recessional movement the cutting edge 22 moves more rapidly than during its forward or cutting stroke, which is of considerable value in speeding up the trimming operation. By turning the disk 23 in the direction shown its tendency is to feed the work toward the cutting point, thus relieving the operator of a considerable amount of labor in presenting the work to the machine.

In an arrangement shown in Figs. 8 and 9, this feeding action of the shear member is accentuated, the shear member 23a being provided with an edge which varies in diameter, the design being such that at the beginning of the cutting stroke of the edge 22, the lowest part 27 of the shear 23a is presented to the work. As the shear 23 continues to turn, it presents an edge portion of constantly increasing diameter to the work which acts as a wedge in forcing the work up to the cutting edge 22, and at the same time acts with increasing frictional force to feed the work toward the cutting point. In this arrangement it may be preferable to provide the shear cutter 23a with a sharp cutting edge 28, rather than a square edge as shown in the preceding figures.

In dealing with certain classes of work, it is desirable to provide a work guide or guard as shown herein in Figs. 1, 2 and 3. This guide consists of a finger 29 carried by a resilient arm 30 secured to the upper surface of the arm 7 at the point 31. For adjusting the position of the finger 29, it is preferable to provide the arm 30 with a screw-threaded opening for the reception of an adjusting screw 32 which bears against the upper surface of the arm 7a. In trimming some kinds of work wherein abnormally thick places such as seams occur, it may be desirable to raise the finger 29 to facilitate passage of such thick portions and for this purpose I may provide a lifting member 33 engaging the end surface of the arm 30 and constituting one arm of a lever pivoted at 34 on the side of the work support and having a second arm 35 projecting up to a convenient position for manipulation by the operator. Preferably the arm 30 and the means for lifting it should be removable so that they may be dispensed with when not required.

Referring to Figs. 10 and 11 I have illustrated a modified construction wherein the main drive shaft 6a, driven by the pulley 4b extends longitudinally through the work supporting horn or arm 7a and carries at its end the eccentric 16a. In this case the tubular shaft for the shear cutter is omitted and the shear cutter 23b is secured directly to the end of the shaft 6a, or more accurately speaking to the end of the eccentric 16a, by means of the screw 26b. The cutter is provided with a sleeve portion 17a which telescopes over the eccentric 16ª, but in this instance the sleeve is provided with a horizontally elongate slot 36 (Fig. 10). The cutter arms 18ª and 19ª pass through slots 20ª and 20ᵇ respectively in the edge of the arm 7ª, both of the slots in this instance being of such width as to confine the cutter to a substantially rectilinear motion in a vertical direction.

As an alternative to this latter construction the parts may be arranged as shown in Fig. 12 wherein the eccentric 16ᵇ is housed in a vertically elongate slot 38 in the sleeve member 17ᵇ of the cutter. The arm 19 (or 19ª) of the previous constructions is omitted, and the arm 18ᵇ passes freely through the circumferentially elongate slot S. In this arrangement the cutter is provided with a pair of oppositely extending horizontal arms 38 and 39 passing through slots 40 and 41 respectively in the edge of the horn 7ª. With this arrangement the cutter is reciprocated in a horizontal rectilinear path. Preferably the cutter beak 21ᵇ is furnished with a cutting edge 22ᵇ which more nearly approaches the vertical than the edges of the previously described cutters. In this latter arrangement it will be noted that the cutting stroke is subsantially in the direction of the line of cut.

Under certain conditions it may be desirable to keep the cutter 23 or equivalent member stationary rather than to rotate it and under such circumstances this may readily be accomplished by securing the cutter directly to the work supporting arm. In this event the shear cutter need not be circular, and it may be provided with a plurality of cutting edges if desired so that by adjustably changing the position of the cutter, a fresh cutting edge may be provided from time to time.

While it has been suggested that the work supporting arm should be of circular cross section, this is not essential nor is it wholly necessary that the arm be tubular, although for best results the moving parts, with the exception of the cutter or cutters, should be housed within the arm.

The guard finger 29 is of utility in trimming the lining at the edge of a shoe upper as illustrated in Fig. 3, where this finger is shown as extending downwardly between the edge U of the leather or other material forming the outer surface of the upper and the vibrating cutter beak 21, thus protecting the edge of the material from the cutter without interfering with the proper position of the lining L between the edges of the cutters.

In certain of the appended claims I refer to the horn or arm 7 as of "small cross sectional area" and in using this expression I wish to indicate that the cross sectional area of the arm is such as to permit its ready insertion within the work to be operated on or to avoid interference with adjacent parts of the work. I have likewise referred to the upper cutter as a "vibrating" cutter and by this term wish to include such motions of the cutter as comprise either or both reciprocating or oscillating components.

I contemplate that various changes in size, proportions and relative position of parts and the substitution of equivalents may be made without departing from the spirit of the invention.

I claim:

1. A trimming machine having an overhanging horn, a cutter at the free end of the horn, said cutter being of substantially the same diameter as the end portion of the horn, an oscillating cutter cooperable with the first to produce a shear cut, and means within the horn for actuating both cutters.

2. A trimming machine having an overhanging arm, a rotary cutter at the free end of the arm, said cutter being of a diameter not substantially greater than the diameter of the end of the arm, and a second cutter cooperable with the first to form a shear cut, means for guiding said second cutter so that its motion comprises reciprocatory and rotary components, and means within the arm for actuating both cutters.

3. A trimming machine having an overhanging arm, a vibratory cutter at the free end of the arm, means for guiding and actuating said cutter so that its motion comprises a rotary component, and a shear cutter at the free end of the arm adapted to cooperate with the vibratory cutter in making a shear cut.

4. A trimming machine having an overhanging arm, a rotary cutter at the free end of the arm, said cutter being of a diameter such that it does not project substantially beyond the periphery of the arm, a second cutter cooperable with the first to form a shear cut, and means for imparting to the second cutter a combined motion of reciprocation and oscillation.

5. A trimming machine having an overhanging horn of such length and transverse dimensions as to permit its ready entry into a shoe upper, a disk cutter at the free end of the horn, a vibratory cutter cooperable with the disk cutter and movable in a curvilinear path, and means within the horn for driving the disk cutter and for the oscillating cutter.

6. A trimming machine having an overhanging arm of such length and transverse dimensions as to permit its ready insertion into a shoe upper, a rotary disk cutter at the free end of the arm, said cutter being of a size not substantially greater than the end of the arm, a second cutter having a cutting edge cooperable with the disk cutter to form a shear cut, and means within the arm for turning the rotary cutter and for moving the second cutter so that any point in the edge of the latter cutter travels in a curved path in approaching the first cutter.

7. A trimming machine having an overhanging arm of such length and transverse dimensions as to permit its ready insertion into a shoe upper, a shear cutter at the free end of the arm, a vibratory cutter having a cutting edge cooperable with the shear cutter to form a shear cut, means within the arm for turning the first cutter, and means carried by the arm for guiding and actuating the second cutter so that its cutting edge moves faster in receding from the work than in approaching it.

8. A trimming machine having an overhanging work supporting arm of such length and cross sectional area as to permit its free insertion into the work to be operated on, a vibrating cutting member adjacent to the free end of the arm, a rotary shear member having the operative portion of its edge substantially flush with the work supporting surface of the arm, and means within the arm for turning the rotary shear member and for vibrating the cutter.

9. An edge trimming machine comprising a work support of small cross sectional area adapted to enter a shoe and support the upper thereof from the inside, cutting means supported by said work support comprising a vibrating cutter member having a cutting edge disposed above the work support, and a cooperating shear member below the work support, means within the work support to drive said cutting means, and guiding means mounted on the work support operable to engage an edge of the work in proximity to said cutting means.

10. A machine of the class described comprising a work support of small cross sectional area, a vibrating cutter member, a hollow shaft rotatably mounted within said work support, means to drive said shaft, means upon said shaft to vibrate said cutter, a shaft within said hollow shaft, a shear member upon said latter shaft cooperating with said cutter member to sever the work, and means to drive said latter shaft.

11. An edge trimming machine comprising a frame having an overhanging work support of small cross-sectional area, a hollow shaft rotatably mounted within said work support, an eccentric upon said shaft, a reciprocating cutter member driven by said eccentric, a shaft within said hollow shaft, a shear member upon said shaft cooperating with said cutter member to shear the work, and means to drive said latter shaft.

12. A machine of the class described comprising a frame having a work support of small cross-sectional area, a cutter member upon the work support having a cutting edge extending above the work support, means to drive the cutter member to move the cutting edge thereof bodily in a curvilinear path, a rotary shear member upon the work support having a peripheral cutting edge to cooperate with said cutter member to sever the work.

13. A machine of the class described comprising a frame having a work supporting arm of small cross-sectional area, a cutter member having a cutting edge extending above the work support, means to drive the cutter member to move the cutting edge thereof bodily in a curvilinear path, a shear member having a peripheral cutting edge to cooperate with said cutter member, and means to drive said shear member in such direction that its cutting edge will move toward the shearing point, the cutter member, the shear member, and the parts for driving them being carried by the work-supporting arm.

14. A machine of the class described comprising a work support of small cross-sectional area, a vertically reciprocating cutter member having a cutting edge disposed above the work support and movable in a curvilinear path, means within the work support to drive said cutter member, and a shear member to cooperate with said cutter member, the cutter member and the shear member being carried by the work support.

15. A machine of the class described comprising a work support of small cross-sectional area, a reciprocating cutter member upon the work support having a cutting edge disposed above the work support and movable in a curvilinear path, means within the work support to drive said cutter member, a rotating shear member having a peripheral cutting edge to cooperate with said cutter member to sever the work, and means to drive said shear member.

16. A machine of the class described comprising a frame having a work support of small cross-sectional area adapted to enter a shoe and permit the upper edge thereof to be fed over it, a vibrating cutter member upon the work support having a cutting edge extending above the work support and movable in a curvilinear path, means within the work support to drive said cutter member, and a shear member upon the work support to cooperate with said cutter member.

17. A machine of the class described comprising a frame, a work support of small substantially circular cross section extending horizontally from said frame and adapted to enter a shoe to support and permit the upper edge thereof to be fed over it, a vibrating cutter member upon the work support, means within the work support to drive said cutter member, and a rotary shear member upon the work support acting with said cutter member to produce a shear cut.

18. A machine of the class described comprising a work support of small cross-sectional area, a vibrating cutter member upon the work support having a cutting edge above the work, means within the work support to drive said cutter member, a rotating shear member having a peripheral cutting edge flush with the upper surface of the work support at the cutting point to cooperate with said cutter member to sever the work, and means within the work support to drive said shear member.

19. A machine of the class described comprising a frame, an overhanging work support of small cross-sectional area, an eccentric within the work support, means to drive said eccentric, a vibrating cutter member mounted upon the eccentric, said cutter member having a cutting edge extending above the work support, means upon the work support to prevent rotation of the lower portion of said cutter member and to cause the cutting edge thereof to be driven in a curvilinear path by said eccentric and in such direction that upon its downward movement it will approach the work support, and a shear member upon the work support to cooperate with said cutter member to sever the work.

20. A trimming machine comprising a frame, a work support of small cross-sectional area, an eccentric within the work support, means to drive the same, a vibrating cutter member upon the eccentric and driven thereby having a cutting edge above the work support, means to prevent rotation of the lower portion of said cutter member and to cause said cutting edge to be driven in a substantially circular path in such direction that upon its downward movement it will approach the work support, and a rotating shear member upon the work support having at least one eccentric cutting edge thereon to cooperate with the cutting edge of said vibrating cutter member to cause the work to be automatically fed through the machine.

21. A machine of the class described comprising a frame, a work support of small cross-sectional area, a reciprocating cutter member, a hollow shaft within said work support, means upon one end of said shaft to vibrate said cutter member, a beveled gear upon the other end thereof, a driven shaft within said hollow shaft, a rotating shear member thereon in shearing relation with said vibrating cutter, a beveled gear upon said driven shaft, and an idle beveled gear meshing with the gears on each of said shafts, whereby said hollow shaft is driven in a reverse direction to that of said driven shaft.

NICHOLAS W. MATHEY.